(12) United States Patent
Numata (10) Patent No.: US 12,155,958 B2
(45) Date of Patent: Nov. 26, 2024

(54) PHOTOELECTRIC CONVERSION DEVICE HAVING SIGNAL IN RESPONSE TO INCIDENCE OF PHOTON, IMAGING DEVICE, CONTROL METHOD, AND STORAGE MEDIUM

(71) Applicant: CANON KABUSHIKI KAISHA, Tokyo (JP)

(72) Inventor: Aihiko Numata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 17/933,629

(22) Filed: Sep. 20, 2022

(65) Prior Publication Data

US 2023/0098566 A1 Mar. 30, 2023

(30) Foreign Application Priority Data

Sep. 24, 2021 (JP) ................. 2021-155379

(51) Int. Cl.
| | |
|---|---|
| *H04N 5/32* | (2023.01) |
| *H04N 25/75* | (2023.01) |
| *H04N 25/773* | (2023.01) |

(52) U.S. Cl.
CPC ............ *H04N 5/32* (2013.01); *H04N 25/75* (2023.01); *H04N 25/773* (2023.01)

(58) Field of Classification Search
CPC ........ H04N 5/32; H04N 25/75; H04N 25/773; H04N 25/79
See application file for complete search history.

(56) References Cited

U.S. PATENT DOCUMENTS

| | | | | |
|---|---|---|---|---|
| 2009/0324244 | A1* | 12/2009 | Koyama | G01J 1/44 398/154 |
| 2015/0163429 | A1 | 6/2015 | Dai | |
| 2020/0003874 | A1* | 1/2020 | Moriyama | H04N 25/75 |
| 2021/0372852 | A1* | 12/2021 | Baba | H04N 25/79 |
| 2022/0006965 | A1* | 1/2022 | Zhu | H04N 25/79 |
| 2023/0048083 | A1* | 2/2023 | Mahara | G01S 7/4865 |
| 2023/0132196 | A1* | 4/2023 | Mahara | G01S 7/4861 356/5.01 |

FOREIGN PATENT DOCUMENTS

WO   WO-2021085123 A1 *   5/2021   ............ G01S 17/10

* cited by examiner

*Primary Examiner* — Padma Haliyur
(74) *Attorney, Agent, or Firm* — Canon U.S.A., Inc. IP Division (57) ABSTRACT

A photoelectric conversion apparatus includes a pixel including a photoelectric conversion circuit configured to output a signal corresponding to photon incidence. The photoelectric conversion apparatus further includes a first measurement circuit, a second measurement circuit, a selection circuit, and an output circuit. The first measurement circuit is configured to measure the signal output from the pixel. The second measurement circuit is configured to measure a time from when the first measurement circuit starts measuring the signal to when a measured value of the first measurement circuit reaches a first threshold value. The selection circuit is configured to switch a first measurement circuit to be connected to the second measurement circuit among a plurality of first measurement circuits. The output circuit is configured to output a value of the measured time of the second measurement circuit.

19 Claims, 7 Drawing Sheets

PHOTOELECTRIC CONVERSION DEVICE HAVING SIGNAL IN RESPONSE TO INCIDENCE OF PHOTON, IMAGING DEVICE, CONTROL METHOD, AND STORAGE MEDIUM

BACKGROUND

Technical Field

One disclosed aspect of the embodiments relates to a photoelectric conversion apparatus that outputs a signal corresponding to incident photons.

Description of the Related Art

Recently, a photoelectric conversion apparatus has been discussed in which the number of photons incident on an avalanche photodiode is digitally counted and the counted number is output from a pixel as a digital signal through photoelectric conversion.

United States Patent Application Publication No. 2015/0163429 discusses a configuration including a time counter configured to measure a time in addition to a photon counter configured to count photons. The time counter measures the time from when the photon counter starts counting photons to when the counted number of photons reaches a predetermined value, and calculates a pixel value based on the measured time.

However, in the configuration discussed in United States Patent Application Publication No. 2015/0163429, the photon counter and the time counter are provided for each pixel, which causes an increase in circuit size.

SUMMARY

One aspect of the embodiments is directed to a technique for appropriately performing pixel readout processing while suppressing an increase in circuit size.

According to an aspect of the disclosure, a photoelectric conversion apparatus including a pixel including a photoelectric conversion circuit configured to output a signal corresponding to photon incidence includes a first measurement circuit, a second measurement circuit, a selection circuit, and an output circuit. The first measurement circuit is configured to measure the signal output from the pixel. The second measurement circuit is configured to measure a time from when the first measurement circuit starts measuring the signal to when a measured value of the first measurement circuit reaches a first threshold value. The selection circuit is configured to switch a first measurement circuit to be connected to the second measurement circuit among a plurality of the first measurement circuits. The output circuit is configured to output a value of the measured time of the second measurement circuit.

Further features of the disclosure will become apparent from the following description of exemplary embodiments with reference to the attached drawings.

DESCRIPTION OF THE EMBODIMENTS

Exemplary embodiments of the disclosure will be described in detail below. Each of the exemplary embodiments described below is merely an example for implementing the disclosure and can be modified or changed as appropriate based on a configuration of an apparatus to which any of the exemplary embodiments is applied and various conditions. Thus, the disclosure is not limited to the following exemplary embodiments. Components having the same functions are denoted by the same reference numerals throughout the drawings and redundant descriptions thereof will be omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include digital and/or analog circuits. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above.

<Basic Configuration>

Figure 1:
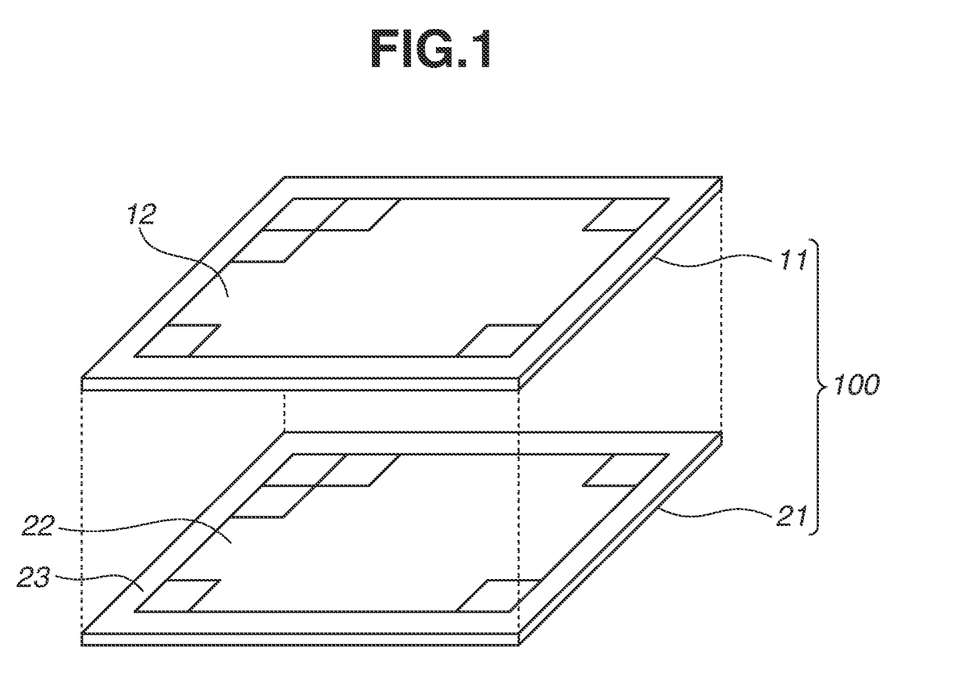
FIG. 1 is a diagram illustrating an example of a configuration of a photoelectric conversion apparatus.

FIG. 1 illustrates an example of a configuration of a photoelectric conversion apparatus 100 according to a first exemplary embodiment. The photoelectric conversion apparatus 100 includes two chips, a sensor chip 11 and a circuit chip 21, which are stacked and electrically connected to each other. The sensor chip 11 includes a pixel area 12. The circuit chip 21 includes a pixel circuit area 22 for processing respective signals detected by a plurality of pixels 201 (refer to FIG. 2) in the pixel area 12 in parallel, and a peripheral circuit area 23 for reading out the signals from the pixel circuit area 22 and controlling the pixel circuit area 22.

<Pixel Substrate>

Figure 2:
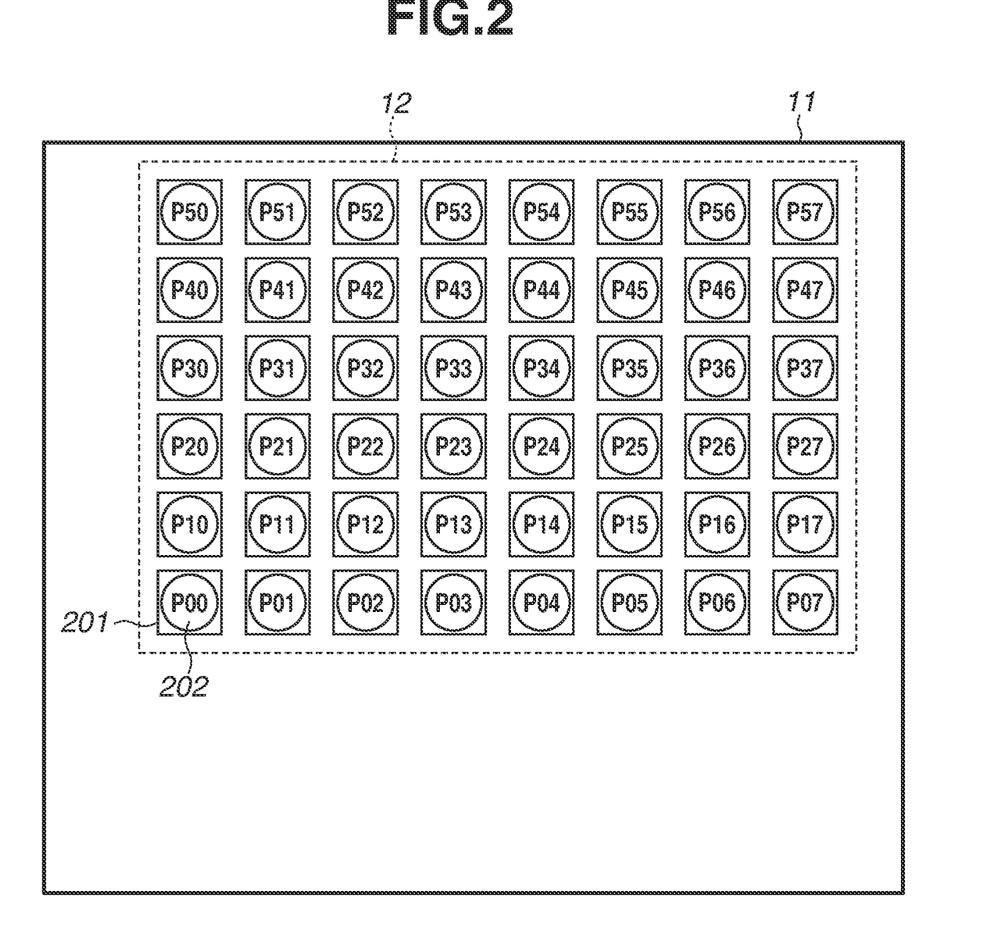
FIG. 2 is a diagram illustrating an example of a sensor chip in the photoelectric conversion apparatus.

FIG. 2 illustrates an example of a configuration of the sensor chip 11. The pixel area 12 in the sensor chip 11 includes the plurality of pixels 201 arranged in a two-dimensional array with a plurality of rows and columns.

Each of the plurality of pixels 201 includes a photoelectric conversion unit or circuit 202 including an avalanche photodiode (hereinafter referred to as an APD) that outputs a signal corresponding to incident photons. More specifically, FIG. 2 illustrates 48 pixels, among the plurality of pixels 201, arranged in six rows from the zeroth row to the fifth row and eight columns from the zeroth column to the seventh column, together with codes each indicating the corresponding row number and column number. For example, the pixel arranged in the first row and the fourth column is indicated with the code "P14". The number of rows and columns of the pixel array that forms the pixel area 12 is not particularly limited.

<Circuit Substrate>

Figure 3:
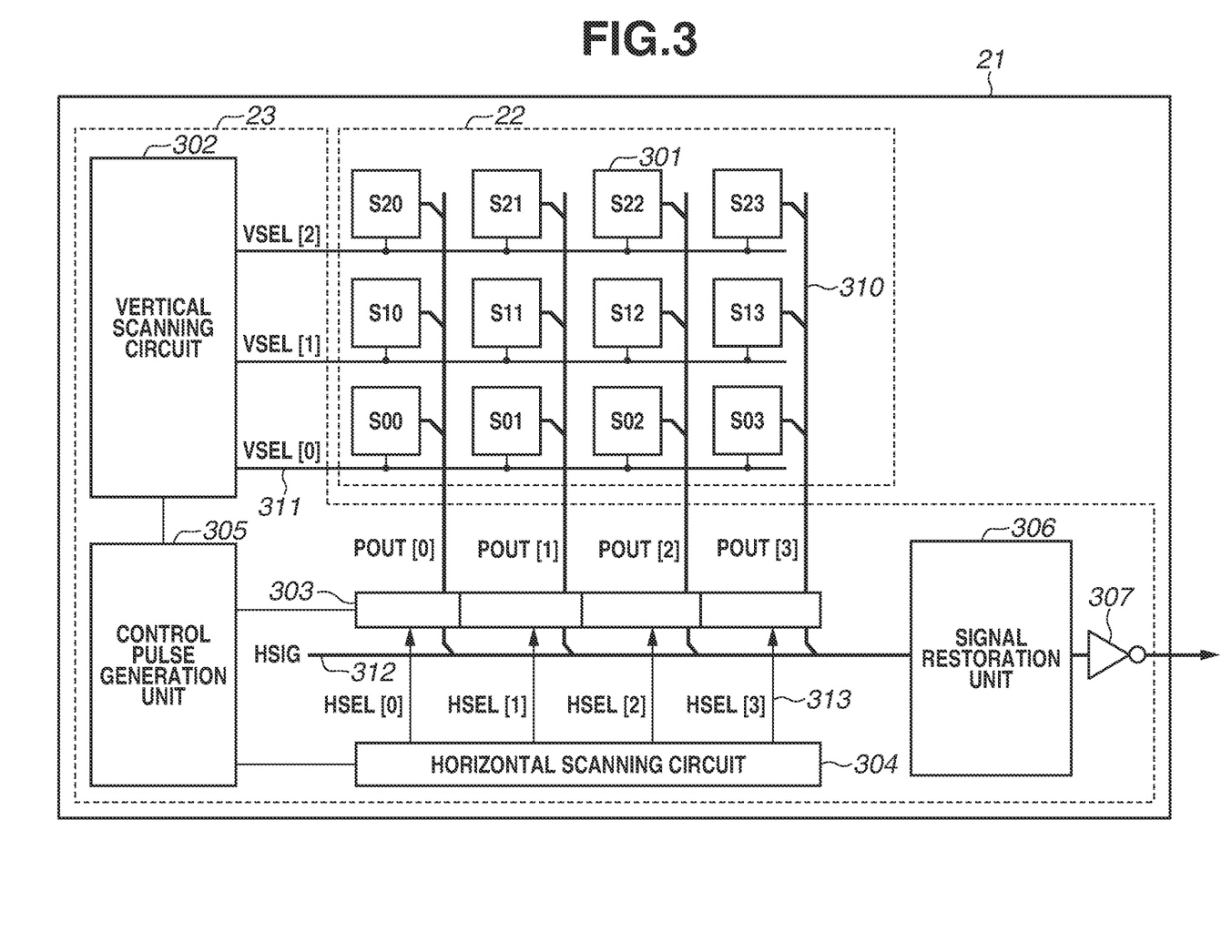
FIG. 3 is a diagram illustrating an example of a circuit chip in the photoelectric conversion apparatus.

FIG. 3 illustrates an example of a configuration of the circuit chip 21. The circuit chip 21 includes the pixel circuit area 22 and the peripheral circuit area 23.

<Pixel Circuit Area>

The pixel circuit area 22 includes a plurality of signal processing circuits 301 that is arranged in a two-dimensional array with a plurality of rows and columns. The plurality of signal processing circuits 301 corresponds to the plurality of pixels 201 in the sensor chip 11. FIG. 3 illustrates 12 signal processing circuits, among the plurality of the signal processing circuits 301, arranged in three rows from the zeroth row to the second row and four columns from the zeroth column to the third column, together with codes each indicating the corresponding row number and column number. For example, the signal processing circuit arranged in the second row and the second column is indicated with the code "S22". The number of rows and columns of the signal processing circuit array that forms the pixel circuit area 22 is not particularly limited. Each of the signal processing circuits 301 includes photon counters 403 (403a, 403b, 403c, and 404d) (first measurement circuits) (refer to FIG. 4) configured to count the number of photons and a time counter 406 (a second measurement circuit) (refer to FIG. 4) configured to measure a time. In the photoelectric conversion apparatus 100 according to the present exemplary embodiment, the photon counters 403 are respectively provided for the plurality of pixels 201, whereas the time counter 406 is shared by a group of pixels among the plurality of pixels 201. More specifically, a group of pixels having different spectral sensitivity in the pixel area 12 is regarded as a partial pixel area, and the photon counters 403a, 403b, 403c, and 403d are provided for the corresponding pixels 201a, 201b, 201c, and 201d (refer to FIG. 4) that have different spectral sensitivity, whereas the time counter 406 is provided for each partial pixel area. Such a configuration makes it possible to reduce the circuit size. Details thereof will be described below.

<Peripheral Circuit Area>

The peripheral circuit area 23 includes a vertical scanning circuit 302, column circuits 303, a horizontal scanning circuit 304, a control pulse generation unit or circuit 305, a signal restoration unit or circuit 306, and a signal output circuit 307. In respective rows of the signal processing circuit array in the pixel circuit area 22, vertical selection lines 311 (VSEL) are arranged extending in a first direction (a horizontal direction in FIG. 3). Each of the vertical selection lines 311 (VSEL) is connected to the corresponding signal processing circuits 301 arranged in the first direction and forms a signal line. The first direction in which the vertical selection lines 311 (VSEL) extend is also referred to as a row direction or a horizontal direction. FIG. 3 illustrates the vertical selection lines 311 (VSEL), together with codes each indicating the corresponding row number. For example, the vertical selection line in the first row is indicated with the code "VSEL[1]". The vertical selection lines 311 (VSEL) in respective rows are connected to the vertical scanning circuit 302. The vertical scanning circuit 302 supplies a vertical selection signal for selectively driving the plurality of signal processing circuits 301, to the plurality of signal processing circuits 301 via the vertical selection lines 311 (VSEL). In the present exemplary embodiment, each of the vertical selection lines 311 (VSEL) is divided into a readout vertical selection line for reading out the signals of the plurality of signal processing circuits 301 in each row and a reset vertical selection line for resetting the signals of the plurality of signal processing circuits 301 in each row.

In respective columns of the signal processing circuit array in the pixel circuit area 22, vertical signal lines 310 are arranged extending in a second direction (a vertical direction in FIG. 3) that intersects the first direction. Each of the vertical signal lines 310 is connected to the corresponding signal processing circuits 301 arranged in the second direction and forms a common signal line. The second direction in which the vertical signal lines 310 extend is also referred to as a column direction or a vertical direction. FIG. 3 illustrates the vertical signal lines 310, together with codes each indicating the corresponding column number. For example, the vertical signal line in the third column is indicated with the code "POUT[3]". Each of the vertical signal lines 310 in respective columns includes n-number of signal lines for outputting an n-bit digital signal.

The horizontal scanning circuit 304 supplies a horizontal selection signal for reading signals from the column circuits 303, to the column circuits 303. The horizontal scanning circuit 304 supplies the horizontal selection signal to the column circuits 303 in respective columns via horizontal selection lines 313 (HSEL). When receiving the horizontal selection signal from the horizontal scanning circuit 304, the column circuits 303 sequentially output the signals stored therein to the signal output circuit 307 via a signal line 312 (HSIG) and the signal restoration circuit 306. FIG. 3 illustrates the horizontal selection lines 313 (HSEL), together with codes each indicating the corresponding column number. For example, the horizontal selection line in the third column is indicated with the code "HSEL[3]".

The control pulse generation circuit 305 supplies control pulse signals for controlling operations of the vertical scanning circuit 302, the horizontal scanning circuit 304, and the column circuits 303 and timings of the operations. At least part of the control pulse signals for controlling the operations of the vertical scanning circuit 302, the horizontal scanning circuit 304, and the column circuits 303 and the timing of the operations may be supplied from the outside of the photoelectric conversion apparatus 100. The signal restoration circuit 306 calculates a pixel value from a value of the time counter 406 and outputs the pixel value to the signal output circuit 307. The signal output circuit 307 outputs a signal corresponding to the pixel value output from the signal restoration circuit 306, as an output signal SOUT of the photoelectric conversion apparatus 100. Alternatively, the configuration may be such that the value of the time counter 406 is directly output, i.e., the signal restoration circuit 306 is provided outside the photoelectric conversion apparatus 100.

<Pixel Circuit>

Figure 4:
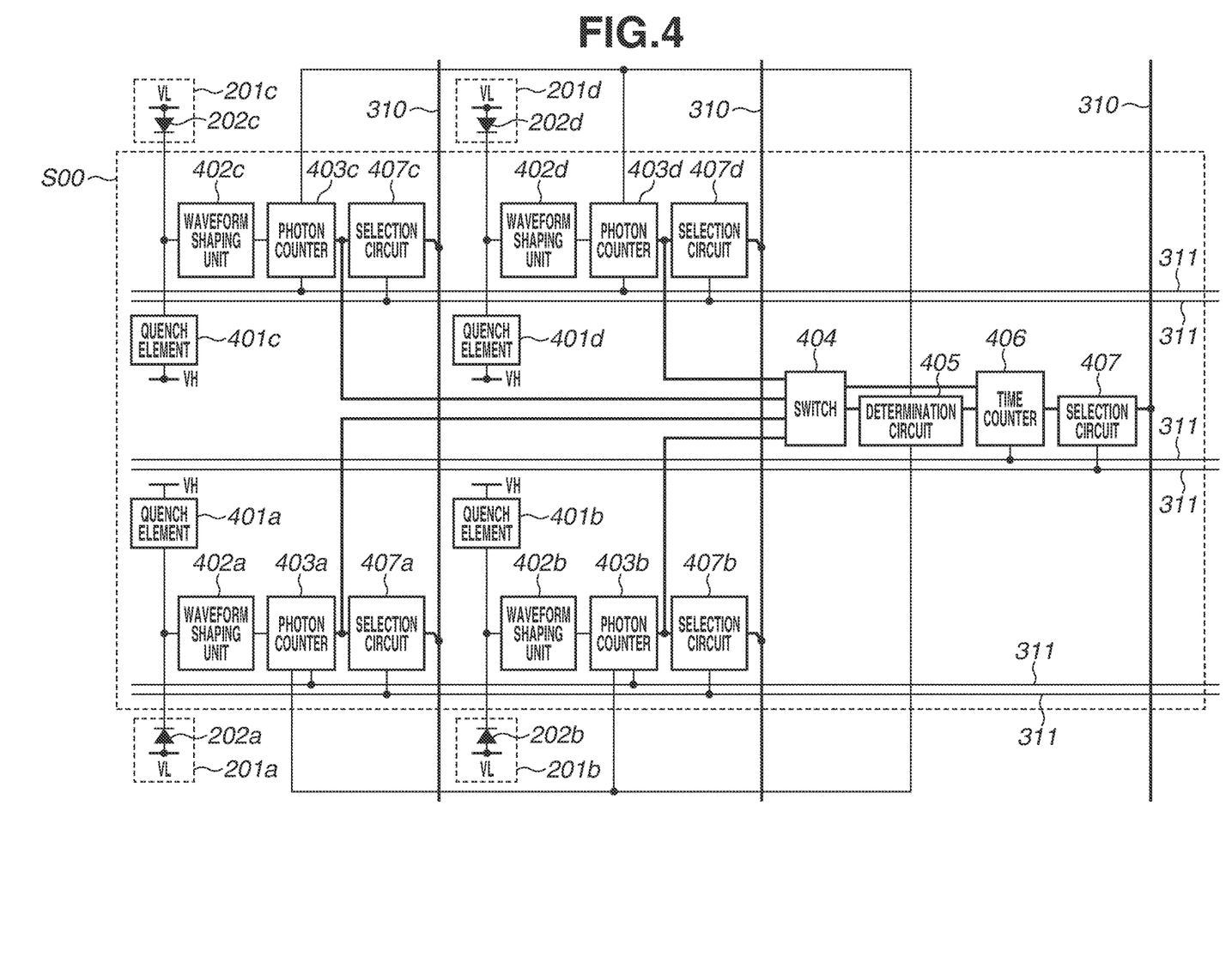
FIG. 4 is a diagram illustrating an example of an equivalent circuit illustrating a pixel and a signal processing circuit in the photoelectric conversion apparatus.

FIG. 4 is an example of an equivalent circuit and a block diagram illustrating the plurality of pixels 201 in FIG. 2 and the plurality of signal processing circuits 301 in FIG. 3. More specifically, FIG. 4 illustrates one of the plurality of signal processing circuits 301 (having the code S00) and the corresponding four pixels 201a, 201b, 201c, and 201d. The four pixels 201a, 201b, 201c, and 201d are different in spectral sensitivity from each other. For example, the pixel 201a is a white pixel, the pixel 201b is a red pixel, the pixel 201c is a blue pixel, and the pixel 201d is a green pixel. In the present exemplary embodiment, the difference in spectral sensitivity means that quantum efficiency is different in at least a part of wavelengths to which the photoelectric conversion circuit 202 has sensitivity. Thus, a spectral shape of spectral sensitivity may be different, or the spectral shape may be the same and the peak quantum efficiency may be different. A case in which the sensitivity of the pixel 201a is higher than those of the pixels 201b, 201c, and 201d in all wavelengths to which the photoelectric conversion circuit 202 has sensitivity will be described below as an example. The condition of this case is satisfied, for example, if the pixel 201a is a white pixel, the pixel 201b is a red pixel, the pixel 201c is a blue pixel, and the pixel 201d is a green pixel. In the following description, if the four pixels 201 are to be distinguished from each other, the alphabets "a", "b", "c", and "d" will be respectively added to the corresponding reference numeral 201, and if it is unnecessary to distinguish the four pixels 201 from each other, the alphabets "a", "b", "c", and "d" will be omitted. In the present exemplary embodiment a group of pixels having different spectral sensitivity among the plurality of pixels 201 is regarded as a partial pixel area, and the photon counters 403a, 403b, 403c, and 403d are respectively provided for the pixels 201a, 201b, 201c, and 201d that have different spectral sensitivity, whereas the time counter 406 is provided for each partial pixel area.

Each of the plurality of pixels 201 in the sensor chip 11 includes the photoelectric conversion circuit 202 (hereinafter also referred to as the APD 202). When photons are incident on the APD 202 (each of 202a, 202b, 202c, and 202d in FIG. 4), a charge pair is generated by photoelectric conversion. A voltage VL (a first voltage) is supplied to an anode of the APD 202. A voltage VH (a second voltage) higher than the voltage VL supplied to the anode is supplied to a cathode of the APD 202 via a switch element (not illustrated). A reverse bias voltage enabling the APD 202 to perform an avalanche multiplication operation is supplied to the anode and the cathode. In such a voltage supply state, the charge generated by the incident light causes the avalanche multiplication, thereby generating an avalanche current.

In a case where the reverse bias voltage is supplied, there is a Geiger mode in which the APD 202 is operated with a potential difference between the anode and the cathode larger than a breakdown voltage, and a linear mode in which the APD 202 is operated with the potential difference between the anode and the cathode near or below the breakdown voltage. The APD 202 operated in the Geiger mode is referred to as a single photon avalanche diode (SPAD). For example, the voltage VL (the first voltage) is −30 V and the voltage VH (the second voltage) is 1 V.

Each of the signal processing circuits 301 in the circuit chip 21 includes quench elements 401 (401a, 401b, 401c, and 401d), waveform shaping units or circuits 402 (402a, 402b, 402c, and 402d), the photon counters 403 (403a, 403b, 403c, and 403d), a switch 404, a determination circuit 405, the time counter 406, and selection circuits 407.

Each of the quench elements 401 is connected to a power source that supplies the voltage VH and to the APD 202. Each of the quench elements 401 has a function of replacing an avalanche current change in the APD 202 with a voltage signal. Each of the quench elements 401 functions as a load circuit (a quench circuit) at the time of signal multiplication by the avalanche multiplication. Each of the quench elements 401 reduces the voltage to be supplied to the APD 202 to suppress the avalanche multiplication (which is referred to as a quench operation).

Each of the waveform shaping circuits 402 shapes a potential change at the cathode of the APD 202 obtained at the time of photon detection and outputs pulse signals. For example, each of the waveform shaping circuits 402 uses an inverter circuit or a buffer circuit.

Each of the photon counters 403 measures the number of photons incident on the corresponding pixel 201. More specifically, each of the photon counters 403 counts the pulse signals output from the corresponding waveform shaping circuit 402 up to, for example, a first threshold value Cx. Each of the photon counters 403 resets the measured value if a predetermined control signal is supplied thereto via the corresponding vertical selection line 311.

The APDs 202, the quench elements 401, the waveform shaping circuits 402, and the photon counters 403, which are described above, are respectively provided for the plurality of pixels 201. On the other hand, the switch 404, the determination circuit 405, and the time counter 406, which are described below, are provided for each group of four pixels 201 (i.e., each partial pixel area) among the plurality of pixels 201. One selection circuit 407 (407a, 407b, 407c, or 407d) is provided for each of the photon counters 403, and one selection circuit 407 is also provided for the time counter 406 shared by each group of the four pixels 201.

The switch 404 and a request circuit (not illustrated) function to temporally switch between the four photon counters 403a, 403b, 403c, and 403d and connect one of the four photon counters 403a, 403b, 403c, and 403d to the time counter 406. For example, at the start of counting, the photon counter 403a corresponding to the most sensitive pixel among the four pixels 201 is connected to the time counter 406 via the switch 404.

When the measured value of the photon counter 403a reaches the first threshold value Cx, the photon counter 403 having the highest measured value (e.g., the photon counter 403b) among the photon counters 403b, 403c, and 403d is connected to the time counter 406. Then, when the measured value of the photon counter 403b reaches the first threshold value Cx, the photon counter 403 having the highest measured value (e.g., the photon counter 403c) between the photon counters 403c and 403d is connected to the time counter 406. Finally, when the measured value of the photon counter 403c reaches the first threshold value Cx, the connection destination of the time counter 406 is switched to the photon counter 403d.

The determination circuit 405 determines whether the measured value of the photon counter 403 connected to the time counter 406 reaches the first threshold value Cx. The time counter 406 measures the time from when the photon counter 403 starts measuring the signal output from the corresponding pixel 201 to when the measured value reaches the first threshold value Cx, and outputs the measured time as a pixel value. In other words, at a time when the determination circuit 405 determines that the measured value of the photon counter 403 reaches the first threshold value Cx, the time counter 406 stores a value of the measured time at this time as the pixel value. Then, the time counter 406 transmits the stored value to a peripheral circuit at a timing of receiving a request signal transmitted from the request circuit (not illustrated). At the same time, the connection destination of the time counter 406 is switched to another photon counter 403. The time counter 406 repeats this operation and continues counting until each of the measured values of the photon counters 403a, 403b, 403c, and 403d reaches the first threshold value Cx. At a time when every measured value reaches the first threshold value Cx, the time counter 406 stops counting the time to store the value, and reads out the value of the time when each of the four photon counters 403a, 403b, 403c, and 403d reaches the first threshold value Cx, in response to a request signal.

As described above, switching the connection destination of the time counter 406 makes it possible to measure the time when the measured value of each of the photon counters 403a, 403b, 403c, and 403d reaches the first threshold value Cx while sharing the time counter 406 among the four pixels 201. Further, even after the pixel 201 connected to the time counter 406 reaches a threshold value, the time taken for each of the other pixels 201 sharing the time counter 406 to saturate can be measured, so that photon measurement can be accurately performed. The shorter the time to reach the first threshold value Cx is, the larger the amount of light incident on the pixel 201 per unit time is (the brighter the light is). Thus, the time counter 406 measures the time taken for saturation, so that brightness information about each of the pixels 201 can be acquired from the value of the measured time of the time counter 406. A switching operation and processing for restoring a pixel signal from the value of the measured time of the pixel counter 406 will be described in detail below.

<Selection Circuit>

The selection circuit 407 switches between electrical connection and disconnection of the time counter 406 and the corresponding vertical signal line 310, based on the vertical selection signal for reading signals in the n-th row that is supplied from the vertical scanning circuit 302 in FIG. 3 via the corresponding vertical selection line 311. The value of the measured time is transmitted to the corresponding column circuit 303 via the corresponding vertical signal line 310 and is output to the outside of the photoelectric conversion apparatus 100 via the signal restoration circuit 306 and the signal output circuit 307. The selection circuit 407 reads out the value of the measured time based on a readout selection signal supplied from the corresponding vertical selection line 311, and then the photon counters 403 and the time counter 406 are reset by reset signals supplied via the vertical selection lines 311. The photon counters 403 and the time counter 406 restart counting the photons and the time, respectively.

<Switching of Counter>

Figure 5:
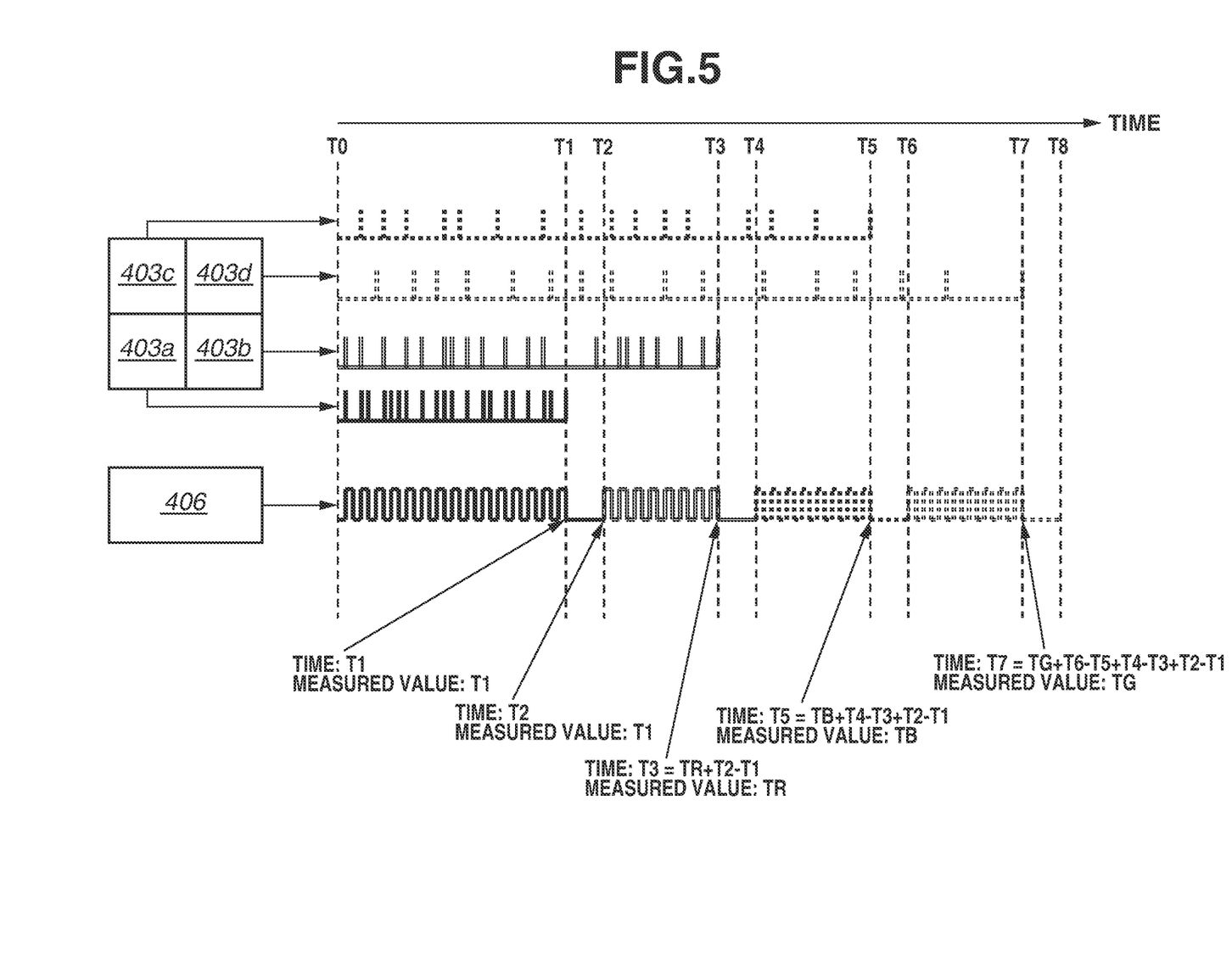
FIG. 5 is a diagram illustrating an example of measurement by the photoelectric conversion apparatus.

FIG. 5 is a schematic diagram illustrating the operation for switching the connection destination of the time counter 406 in the photoelectric conversion apparatus 100. In FIG. 5, the horizontal axis represents time, and the vertical axis schematically represents the output of the time counter 406 in the form of pulses. At a time T0 when the time counter 406 starts counting, the time counter 406 is connected to the photon counter 403a. After the start of counting, photons are incident on each of the pixels 201, and the count of each of the photon counters 403a, 403b, 403c, and 403d increases based on the incident rate of the photons. The time counter 406 stops counting the time at a time T1 when the count of the photon counter 403a reaches the first threshold value Cx and stores a measured value T1. The stored measured value T1 is read out and transmitted to the peripheral circuit at a time T2 when a request signal transmitted from the request circuit (not illustrated) is received.

At the time T1, the measured values of the photon counters 403b, 403c, and 403d, which are not connected to the time counter 406 at the time T1, are compared to each other by using the determination circuit 405. Based on a result of the comparison, the connection destination of the time counter 406 is switched to the photon counter 403 having the highest measured value. In the example of FIG. 5, the connection destination is switched to the photon counter 403b at the time T2, which is expressed by drawing the pulses of the time counter 406 after the time T2 with the same double line as that indicating the pulses of the photon counter 403b.

Then, the time counter 406 stops counting the time at a time T3 when the count of the photon counter 403b reaches the first threshold value Cx, and stores a measured value TR. The stored measured value TR is read out and transmitted to the peripheral circuit at a time T4 when a request signal transmitted from the request circuit (not illustrated) is received, similarly to the case of the photon counter 403a.

Similarly, at the time T3, the measured values of the photon counters 403c and 403d are compared to each other by using the determination circuit 405. Based on a result of the comparison, the connection destination of the time counter 406 is switched to the photon counter 403 having the higher measured value. In the example of FIG. 5, the connection destination of the time counter 406 is switched to the photon counter 403c at the time T4, which is expressed by drawing the pulses of the time counter 406 after the time T4 with the same dotted line as that indicating the pulses of the photon counter 403c.

Then, the time counter 406 stops counting the time at a time T5 when the count of the photon counter 403c reaches the first threshold value Cx, and stores a measured value TB. The stored measured value TB is read out and transmitted to the peripheral circuit at a time T6 when a request signal is received.

Finally, at the time T6, the connection destination of the time counter 406 is switched to the remaining photon counter 403d. Similarly, the pulses of the time counter 406 after the time T6 are expressed by the same dotted double line as that indicating the pulses of the photon counter 403d.

Then, the time counter 406 stops counting the time at a time T7 when the count of the photon counter 403d reaches the first threshold value Cx, and stores a measured value TG. The stored measured value TG is read out and transmitted to the peripheral circuit at a time T8 when a request signal is received. The photoelectric conversion apparatus 100 having such a configuration can use the one time counter 406 to measure the time taken for each of the plurality of photon counters 403 to saturate. In other words, the photoelectric conversion apparatus 100 according to the present exemplary embodiment shares the time counter 406 among a group of a plurality of pixels, thereby suppressing the circuit size. Further, by switching the connection destination of the time counter 406 in the middle of the operation, the photoelectric conversion apparatus 100 addresses an issue caused by sharing the time counter 406 among the plurality of pixels.

The time counter 406 is stopped during periods between the time T1 and the time T2, between the time T3 and the time T4, between the time T5 and the time T6, and between the time T7 and the time T8. Thus, the measured values in the periods during which the time counter 406 is stopped are to be restored. More specifically, the measured values are calculated using the following formulas, as indicated in FIG. 5.

$$T3 = TR + T2 - T1$$

$$T5 = TB + T4 - T3 + T2 - T1$$

$$T7 = TG + T6 - T5 + T4 - T3 + T2 - T1$$

<Spectral Sensitivity and Bayer Array>

While FIGS. 3 and 4 illustrate the example in which one of the plurality of signal processing circuits 301 is connected to the four pixels 201, the circuit size can be reduced if the number of pixels 201 connected to the one signal processing circuit 301 is two or more. More specifically, the configuration according to the present exemplary embodiment is such that the photon counters 403 are respectively provided for the plurality of pixels 201 and the time counter 406 is shared by each group of pixels among the plurality of pixels 201.

However, in order to measure the time taken for each of the plurality of photon counters 403 to saturate by using the same time counter 604, the time is to be different among the photon counters 403. Thus, as described above, the pixels 201 sharing the time counter 406 are to be different in spectral sensitivity from each other. A larger difference in spectral sensitivity is more desirable.

Further, because the pixel to be saturated first is to be the initial connection destination of the time counter 406, it is desirable that there is a pixel higher in sensitivity than any other pixel among the pixels 201 sharing the time counter 406. For example, as described above with reference to FIG. 4, the four pixels 201a, 201b, 201c, and 201d correspond to the white, red, green, and blue pixels, respectively, and the time counter 406 is shared by the four pixels 201a to 201d.

<Signal Restoration Circuit>

The signal restoration circuit 306 restores the measured value of the time counted by the time counter 406 to a pixel signal representing brightness information about a subject. Assuming that the respective times taken for the four pixels 201a, 201b, 201c, and 201d to reach the first threshold value Cx are times T1, T2, T3, and T4, respective pixel signal values C1, C2, C3, and C4 can be calculated by the following formulas:

$$C1=K/T1, C2=K/T2,$$

$$C3=K/T3, C4=K/T4,$$

wherein K is a natural number and is desirably a value that does not allow each of the pixel signal values C1, C2, C3, and C4 to be less than one least significant bit (LSB). More specifically, K may be the maximum measured time value.

<Number of Comparisons of Photon Measured Values>

In the above-described example, the order of connection to the time counter 406 is determined each time the count of any of the photon counters 403 reaches the first threshold value Cx. The order of connection to the time counter 406 may be determined in advance at the time (the time T1 in FIG. 5) when the count of the photon counter 403a reaches the first threshold value Cx. In this case, the number of times of comparing the measured values is reduced, so that lower power consumption can be achieved.

However, particularly in a case where a difference among the measured values of the photon counters 403 is small, the order of connection to the time counter 406 is desirably determined every time the count of any of the photon counters 403 reaches the first threshold value Cx. This is because, in a case where the difference among the measured values of the photon counters 403 is small, it may not possible to accurately predict which of the photon counters 403 is to saturate first, due to an effect of photon shot noise.

Thus, it is further desirable to determine the number of times of reviewing the connection destination of the time counter 406, based on the difference among the measured values of the photon counters 403. More specifically, in a case where the difference among the measured values of the photon counters 403b to 403d other than the photon counter 403a is less than a predetermined threshold value at the time when the count of the photon counter 403a reaches the first threshold value Cx, the order of connection to the time counter is reviewed a plurality of times. In a case where the difference among the measured values is the predetermined threshold value or more, the order of connection to the time counter 406 is not reviewed. The connection destination may be reviewed, for example, by comparing the measured values of the photon counters 403 with each other after a predetermined time from the change of the connection destination. The predetermined threshold value may be determined based on photon shot noise, and may be, for example, a square root of the minimum value of the counts of the other photon counters 403b to 403d at the time when the count of the photon counter 403a reaches the first threshold value Cx.

<Output of Photon Measured Value after Predetermined Time>

The determination circuit 405 may be configured to stop the time counter 406 in a case where the measured value of the photon counter 403 connected to the time counter 406 does not reach the first threshold value Cx even if a predetermined time (a first predetermined time) has elapsed, and to output the measured value of the photon counter 403 at this time. Such a configuration makes it possible to address an issue where a frame rate is reduced in a case where brightness of a subject is very dark. It is desirable to set the maximum time count value as the predetermined time.

The counting by the other photon counter(s) 403 may be stopped at the time (e.g., any of the times T1, T3, and T5 in FIG. 5) when the measured value of any of the photon counters 403 reaches the first threshold value Cx. A case where the counting is stopped at the time T1 will be described next as an example.

In a case where the time T1 is sufficiently close to the maximum time count value (a second threshold value), the maximum time count value is immediately reached even if the counting by the other photon counters 403 continues after the time T1. Thus, it is desirable to stop the counting at the time T1 without switching the connection destination of the time counter 406. For example, in a case where the time T1 is half or more of the maximum time count value, it is desirable to stop the photon counting by the photon counters 403b, 403c, and 403d at the time T1. In other words, in a case where a difference between the value of the measured time of the time counter 406 at the first connection destination and the second threshold value of the time counter 406 is a predetermined value or less, the request circuit outputs the measured values of the photon counters 403 that are not connected to the time counter 406.

In a case where each of the measured values of the photon counters 403b, 403c, and 403d is sufficiently large (a predetermined value or more) at the time T1, it is determined that a desired signal-to-noise ratio (SNR) is obtained.

Then, the counting is desirably stopped at the time T1. For example, in a case where each of the measured values of the photon counters 403b, 403c, and 403d is half or more of the first threshold value Cx at the time T1, the photon counting by the photon counters 403b, 403c, and 403d is desirably stopped at the time T1. The timing of stopping the time counter 406 is not limited to the time T1. The measured value of each of the photon counters 403 may be checked to determine whether to continue the measurement, based on a specific timing or a cycle. In other words, in a case where the measured value of each of the photon counters 403 is a predetermined value or more at a first time point or specific timing, the request circuit outputs the measured value of each of the photon counters 403.

In a case where the difference among the measured values of the photon counters 403b, 403c, and 403d is very small at the time T1 and it is estimated that each of the measured values of the photon counters 403b, 403c, and 403d reaches the first threshold value Cx almost at the same timing, it is desirable to stop the counting at the time T1. This is because it is difficult to accurately measure the timing when the measured value reaches the first threshold value Cx for all the photon counters 403, considering the time taken to switch the time count and the time taken to read and transmit the value of the measured time to the peripheral circuit in response to a request signal. More specifically, in a case where it is estimated that the minimum value of the difference in the time taken for the measured value to reach the first threshold value Cx among the photon counters 403b, 403c, and 403d is less than a total of the time taken to switch the time count and the time taken to read and transmit the value of the measured time to the peripheral circuit in response to the request signal, it is desirable to stop the counting.

In a case where the difference among the measured values of the photon counters 403b, 403c, and 403d is very large at the time T1 and the timing when the measured value reaches the first threshold value Cx is significantly different among the photon counters 403b, 403c, and 403d, it is desirable to stop the counting at the time T1 and to output the measured value of each of the photon counters 403b, 403c, and 403d. This is because a difference in accumulation time among the photon counters 403b, 403c, and 403d becomes large and thus a motion blur between colors is likely to occur. More specifically, in a case where the ratio of the maximum time to the minimum time among the respective times taken for the measured values of the photon counters 403b, 403c, and 403d to reach the first threshold value Cx exceeds 256:1, it is desirable to stop the counting.

In a case where the time when every measured value of the photon counters 403 reaches the first threshold value Cx is sufficiently smaller than the maximum time count value, the photon counting may be performed a plurality of times. For example, in a case where the time T7 in FIG. 5 is less than half of the maximum time count value, the photon counting can be performed twice before the maximum time count value is reached. By performing the photon counting a plurality of times in one frame and calculating the average of the times taken for every measured value of the photon counters 403 to reach the first threshold value Cx, accuracy of the measured value of the time counter 406 is improved. As a result, accuracy of brightness information about each of the pixels 201 can be improved.

<Imaging Apparatus>

Figure 6:
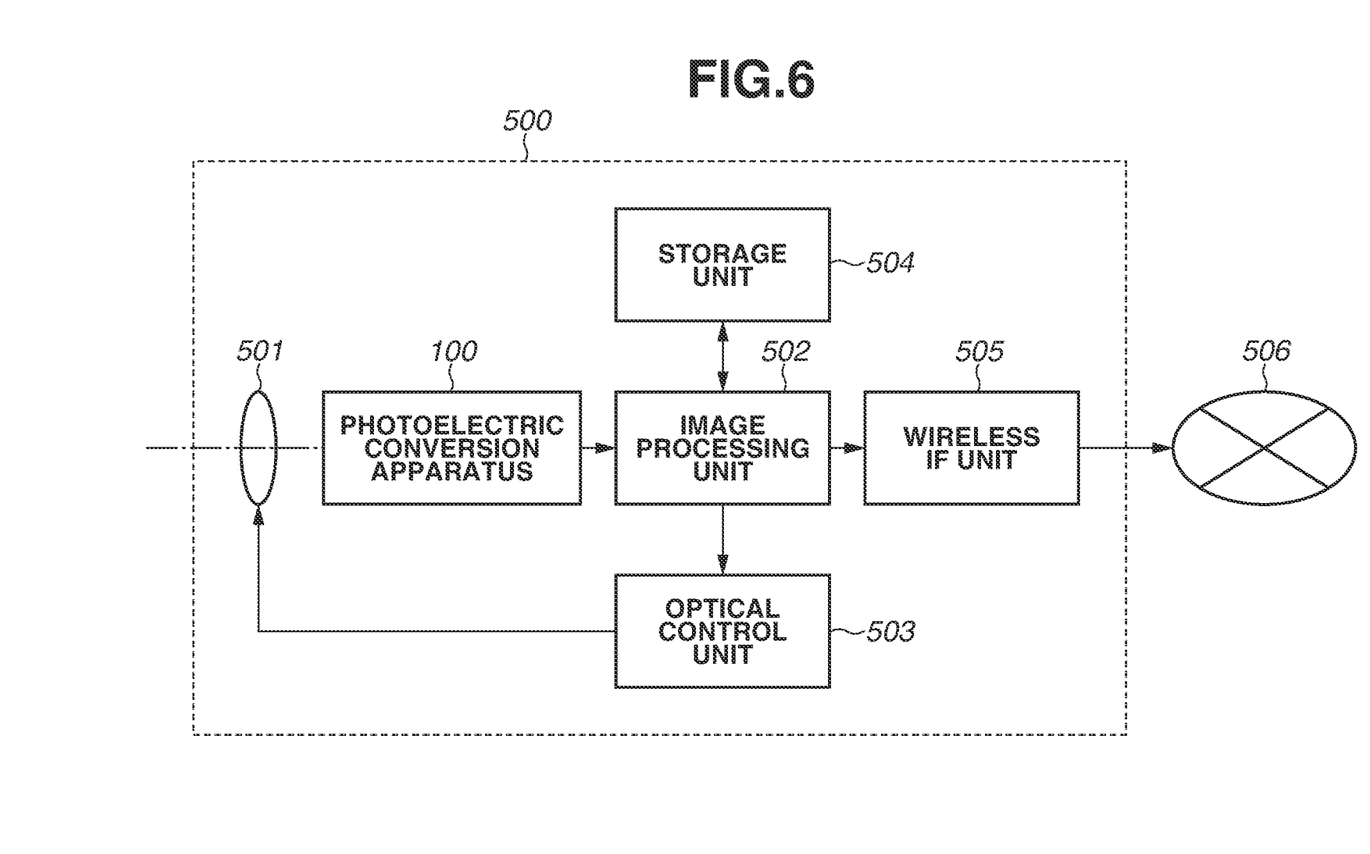
FIG. 6 is a block diagram illustrating an example of a functional configuration of an imaging apparatus including the photoelectric conversion apparatus.

FIG. 6 is a block diagram illustrating an imaging apparatus 500 using the photoelectric conversion apparatus 100.

The imaging apparatus 500 is an imaging apparatus including the photoelectric conversion apparatus 100, such as a digital camera. The imaging apparatus 500 includes a lens 501, an image processing unit or circuit 502, an optical control unit or circuit 503, a storage unit or circuit 504, and a wireless interface (I/F) unit or circuit 505 serving as a communication unit or circuit.

The lens 501 forms an optical image of a subject and causes the formed optical image to be incident on an imaging surface of the photoelectric conversion apparatus 100. The lens 501 includes a focus lens, a zoom lens, and a diaphragm. The photoelectric conversion apparatus 100 captures the optical image formed by the lens 501. A signal read from the photoelectric conversion apparatus 100 is output to the image processing circuit 502. The image processing circuit 502 performs processing on the signal output from the photoelectric conversion apparatus 100, such as signal rearrangement, defective pixel correction, noise reduction, color conversion, white balance correction, gamma correction, and data compression, thereby generating an image. The image processing circuit 502 includes a built-in central processing unit (CPU) serving as a computer, and functions as a control unit or circuit that controls the operation of each component of the imaging apparatus 500 based on a computer program stored in a memory as a storage medium. The image processing circuit 502 also causes each of the selection circuits 407 to perform control to change the sensitivity of the corresponding pixel 201 during a period from when the corresponding photon counter 403 starts measurement to when the measured value of the corresponding photon counter 403 reaches the first threshold value Cx. The optical control circuit 503 controls the focus lens, the zoom lens, and the diaphragm that are included in the lens 501. A storage medium (not illustrated) is attached to the storage circuit 504, and the image output from the image processing circuit 502 is stored in the storage medium. For example, a memory card is used as the above-described storage medium. Alternatively, a hard disk may be used as the storage medium.

The wireless I/F circuit 505 serving as the communication circuit outputs an image signal generated by the image processing circuit 502 to the outside of the imaging apparatus 500. A network 506 includes, for example, a plurality of routers, switches, and cables that meets a communication standard such as Ethernet®, and a client controls the imaging apparatus 500 via the network 506.

<Flowchart>

Figure 7:
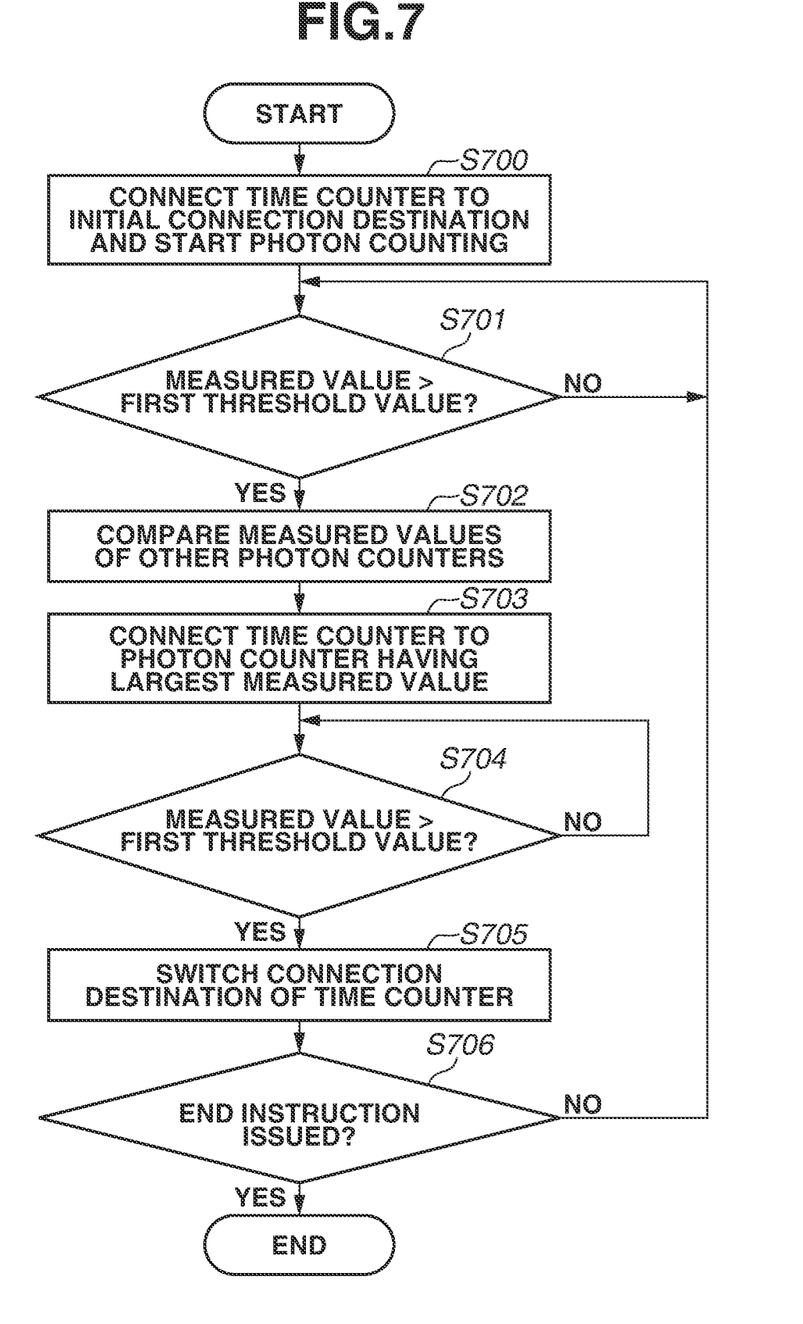
FIG. 7 is a flowchart illustrating an example of an operation of the photoelectric conversion apparatus.

FIG. 7 is a flowchart illustrating an operation performed by the photoelectric conversion apparatus 100. In step S700, the switch 404 connects the time counter 406 to the photon counter 403a that is the initial connection destination among the plurality of photon counters 403.

In step S701, the photoelectric conversion apparatus 100 determines whether the measured value of the photon counter 403a reaches the first threshold value Cx. In a case where the measured value does not reach the first threshold value Cx (NO in step S701), the photon counting and the time counting are continued while the time counter 406 is kept connected to the initial connection destination. In a case where the measured value reaches the first threshold value Cx (YES in step S701), the processing proceeds to step S702. In step S702, the measured values of the photon counters 403b, 403c, and 403d are compared with each other. In step S703, the photoelectric conversion apparatus 100 connects the time counter 406 to the photon counter having the largest measured value among the photon counters 403b, 403c, and 403d. In a case where the order of connection to the time counter 406 is determined in advance, the comparison processing in step S703 is skipped, and the photon counter as the next connection destination is determined based on the order determined in advance.

In step S704, the photoelectric conversion apparatus 100 determines whether the measured value of the photon counter 403 connected to the time counter 406 after the switching of the connection destination reaches the first threshold value Cx. In a case where the measured value does not reach the first threshold value Cx (NO in step S704), the photon counting and the time counting are continued. In a case where the measured value reaches the first threshold value Cx (YES in step S704), the processing proceeds to step S705. In step S705, the photoelectric conversion apparatus 100 switches the connection destination of the time counter 406. The processing in steps S704 and S705 is repeated to measure the time taken for the measured value of each of the photon counters 403 to reach the first threshold value Cx. In step S706, the photoelectric conversion apparatus 100 determines whether an end instruction is issued. In a case where the end instruction is not issued (NO in step S706), the processing returns to step S701 to continue the processing. In a case where the end instruction is issued (YES in step S706), the processing ends.

In the present exemplary embodiment, the example has been described in which the photoelectric conversion apparatus 100 is applied to a digital camera that is as an example of the imaging apparatus 500. However, examples of the imaging apparatus 500 include electronic devices having an imaging function, such as a digital movie camera, a smartphone with a camera, a tablet computer with a camera, an on-vehicle camera, a drone camera, a camera mounted on a robot, and a network camera.

While the present exemplary embodiment has been described in detail above, the disclosure is not limited to the above-described exemplary embodiment and can be modified in various ways based on the gist of the disclosure. These modifications are not excluded from the scope of the disclosure.

A computer program for implementing a part or all of control operations according to the above-described exemplary embodiment may be supplied to the photoelectric conversion apparatus 100, the imaging apparatus 500, or the like via a network or various storage media. Then, the program may be read and executed by a computer (e.g., a CPU or a micro processing unit (MPU)) in the photoelectric conversion apparatus 100, the imaging apparatus 500, or the like. In this case, the program and the storage medium storing the program are included in exemplary embodiments of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-155379, filed Sep. 24, 2021, which is hereby incorporated by reference herein in its entirety.

What is claimed is:

1. A photoelectric conversion apparatus including a pixel including a photoelectric conversion circuit configured to output a signal corresponding to photon incidence, the photoelectric conversion apparatus comprising:
a first measurement circuit configured to measure the signal output from the pixel;
a second measurement circuit configured to measure a time from when the first measurement circuit starts measuring the signal to when a measured value of the first measurement circuit reaches a first threshold value;
a selection circuit configured to switch a first measurement circuit to be connected to the second measurement circuit among a plurality of the first measurement circuits; and
an output circuit configured to output a value of the measured time of the second measurement circuit,
wherein the second measurement circuit is provided for each partial pixel area including a plurality of the pixels different in spectral sensitivity from each other, and
wherein the plurality of first measurement circuits is respectively provided for the plurality of pixels included in the partial pixel area.

2. The photoelectric conversion apparatus according to claim 1, wherein the selection circuit determines the first measurement circuit to be connected to the second measurement circuit, based on measured values of the plurality of first measurement circuits respectively provided for the plurality of pixels included in the partial pixel area.

3. The photoelectric conversion apparatus according to claim 1, wherein the selection circuit connects the second measurement circuit to the first measurement circuit corresponding to a pixel having highest sensitivity among the plurality of pixels included in the partial pixel area, in a predetermined state.

4. The photoelectric conversion apparatus according to claim 3, wherein, in a case where the measured value of the first measurement circuit connected to the second measurement circuit reaches the first threshold value, the selection circuit switches the first measurement circuit connected to the second measurement circuit to a first measurement circuit having the largest measured value among the other first measurement circuits.

5. The photoelectric conversion apparatus according to claim 4, wherein, in a case where a difference between the measured value of each of the first measurement circuits different from the first measurement circuit connected to the second measurement circuit and the first threshold value is less than a predetermined value, the output circuit outputs the measured value of each of the first measurement circuits at a time when the measured value of the first measurement circuit connected to the second measurement circuit reaches the first threshold value.

6. The photoelectric conversion apparatus according to claim 4, wherein, in a case where a difference between the measured value of each of the first measurement circuits different from the first measurement circuit connected to the second measurement circuit and the first threshold value is less than a predetermined value, the selection circuit changes order of the plurality of first measurement circuits to be connected to the second measurement circuit.

7. The photoelectric conversion apparatus according to claim 3, wherein, in a case where a difference between a time taken for the measured value of the first measurement circuit connected to the second measurement circuit to reach the first threshold value and a second threshold value set for the second measurement circuit is less than a predetermined value, the output circuit outputs the measured values of the first measurement circuits at a time when the measured value of the first measurement circuit connected to the second measurement circuit reaches the first threshold value.

8. The photoelectric conversion apparatus according to claim 1, wherein, in a case where each of the measured values of the plurality of first measurement circuits is a predetermined value or more at a time when the value of the measured time of the second measurement circuit reaches a specific value, the output circuit outputs the measured value of each of the plurality of first measurement circuits.

9. The photoelectric conversion apparatus according to claim 8, wherein, in a case where the value of the measured time of the second measurement circuit reaches a second threshold value, the output circuit outputs the measured value of the first measurement circuit connected to the second measurement circuit.

10. The photoelectric conversion apparatus according to claim 1, wherein the plurality of pixels in the partial pixel area includes at least a red pixel, a blue pixel, a green pixel, and a white pixel.

11. The photoelectric conversion apparatus according to claim 1, wherein the second measurement circuit stores the value of the measured time in a period from when the measured value of the first measurement circuit reaches the first threshold value to when a request signal is received from the output circuit.

12. The photoelectric conversion apparatus according to claim 11, wherein, after the request signal is received from the output circuit, the selection circuit switches the first measurement circuit to be connected to the second measurement circuit.

13. The photoelectric conversion apparatus according to claim 1, further comprising a signal restoration circuit configured to restore a pixel signal based on the value of the measured time of the second measurement circuit.

14. The photoelectric conversion apparatus according to claim 13, wherein the signal restoration circuit restores the pixel signal further using a time when the value of the measured time of the second measurement circuit is stored.

15. The photoelectric conversion apparatus according to claim 1, wherein the second measurement circuit measures the time from when the first measurement circuit starts measuring the signal to when the measured value of the first measurement circuit reaches the first threshold value a plurality of times in one frame.

16. The photoelectric conversion apparatus according to claim 1, wherein the photoelectric conversion circuit includes an avalanche photodiode configured to detect the photon incidence.

17. An imaging apparatus comprising the photoelectric conversion apparatus according to claim 1.

18. A method for controlling a photoelectric conversion apparatus including a pixel including a photoelectric conversion circuit configured to output a signal corresponding to photon incidence, the photoelectric conversion apparatus including a first measurement circuit configured to measure the signal output from the pixel, and a second measurement circuit configured to measure a time from when the first measurement circuit starts measuring the signal to when a measured value of the first measurement circuit reaches a first threshold value, the method comprising:
  switching a first measurement circuit to be connected to the second measurement circuit among a plurality of the first measurement circuits; and
  outputting a value of the measured time of the second measurement circuit,
  wherein the second measurement circuit is provided for each partial pixel area including a plurality of the pixels different in spectral sensitivity from each other, and
  wherein the plurality of first measurement circuits is respectively provided for the plurality of pixels included in the partial pixel area.

19. A non-transitory computer-readable storage medium storing a program for causing a computer to perform a method for controlling a photoelectric conversion apparatus including a pixel including a photoelectric conversion circuit configured to output a signal corresponding to photon incidence, the photoelectric conversion apparatus including a first measurement circuit configured to measure the signal output from the pixel, and a second measurement circuit configured to measure a time from when the first measurement circuit starts measuring the signal to when a measured value of the first measurement circuit reaches a first threshold value, the method comprising:
  switching a first measurement circuit to be connected to the second measurement circuit among a plurality of the first measurement circuits; and
  outputting a value of the measured time of the second measurement circuit,
  wherein the second measurement circuit is provided for each partial pixel area including a plurality of the pixels different in spectral sensitivity from each other, and
  wherein the plurality of first measurement circuits is respectively provided for the plurality of pixels included in the partial pixel area.

* * * * *